March 1, 1955  R. J. DODGEN  2,703,125
FRUIT STEMMING MACHINE
Filed Oct. 23, 1952  2 Sheets-Sheet 1

Roy J. Dodgen
INVENTOR.

BY *[signatures]*
Attorneys

March 1, 1955  R. J. DODGEN  2,703,125
FRUIT STEMMING MACHINE
Filed Oct. 23, 1952  2 Sheets-Sheet 2

Roy J. Dodgen
INVENTOR.

United States Patent Office 2,703,125
Patented Mar. 1, 1955.

2,703,125

FRUIT STEMMING MACHINE

Roy J. Dodgen, Point Lookout, Mo.

Application October 23, 1952, Serial No. 316,500

6 Claims. (Cl. 146—55)

The present invention relates to a machine for stemming fruits, such as grapes, strawberries, cherries and the like, and more particularly relates to a machine adapted for the removal of stems from strawberries.

The objects of the invention are primarily to provide a stemming machine that will:

(1) Positively cause the berries to tumble or roll in a multiplicity of directions during their passage over the stemming rollers to more completely assure the removal of the stems by the rollers.

(2) That will lengthen the path of movement of the berries over the stemming rollers to further effect the complete removal of the stems by the rollers.

(3) That will, by accomplishing the foregoing objects, greatly increase the yield of stemmed berries than was heretofore known in the art.

These, together with various ancillary objects and features are attained by the present invention, a preferred embodiment of which is shown by way of example only in the accompanying drawings, wherein.

Figure 1:
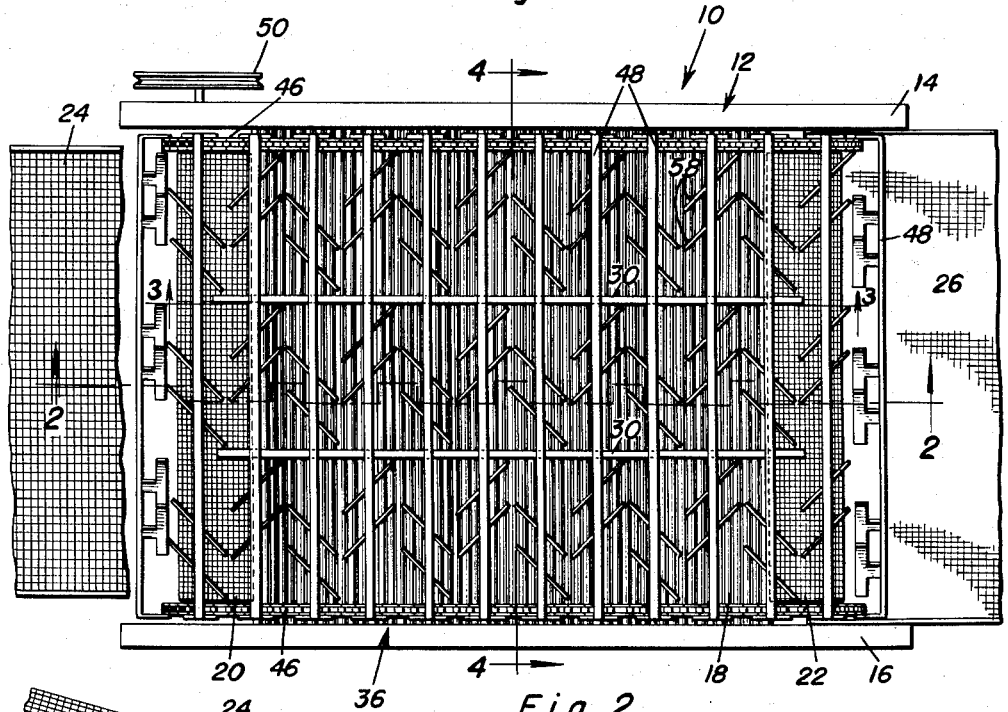
Figure 1 is a top elevational view of a fruit stemming machine to which the present invention is applied.
Figure 2:
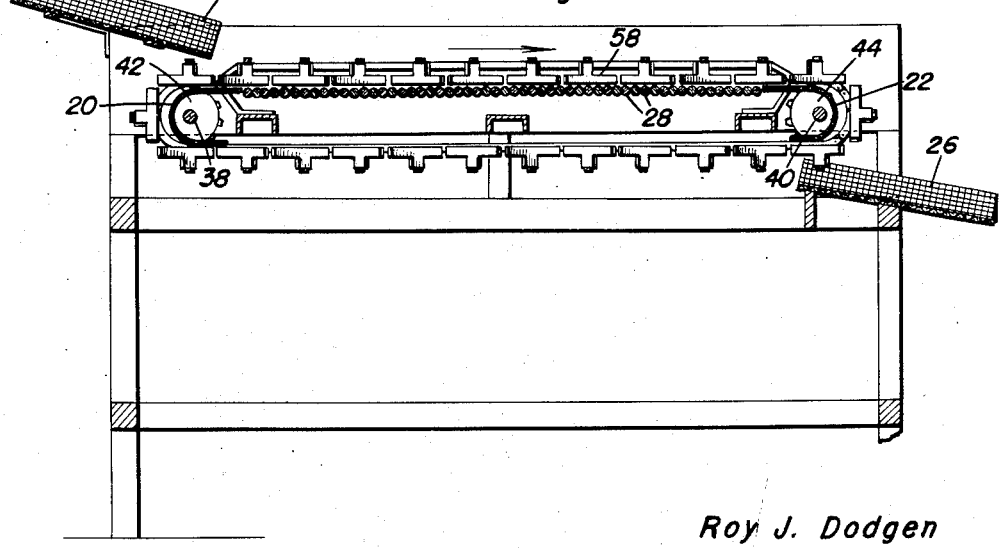
Figure 2 is a side elevation of the stemming machine to which the present invention is applied taken substantially along section line 2—2 of Figure 1.

Referring now to the accompanying drawings in detail, wherein like reference numerals are utilized to designate similar parts throughout the various views, attention is first directed to Figure 1 wherein the numeral 10 designates the fruit stemming apparatus in its entirety.

The stemming apparatus or machine 10 consists generally of a suitable frame 12, which in the preferred embodiment shown is rectangular in shape and includes a pair of spaced, parallel side frame members 14 and 16, a substantially solid bottom 18 with foraminous screens 20 and 22 at the forward and rearward ends of the bottom 18 for drainage purposes. An inlet chute 24 is mounted in any suitable manner above the forward end of the frame 12 to deposit fruit upon the bottom of the frame and a discharge chute 26 is mounted at the rearward end of the frame below the bottom thereof for conducting fruit from the machine after the same has been stemmed.

Figure 3:
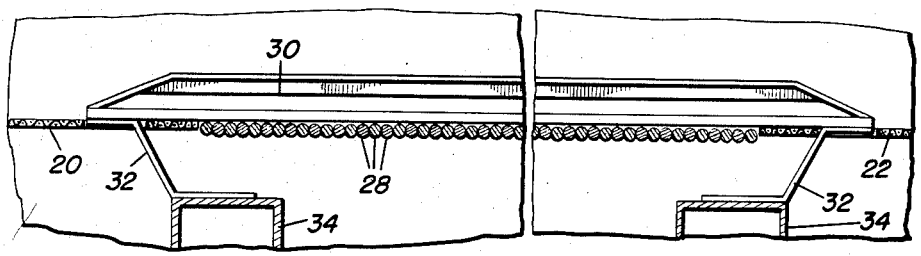
Figure 3 is a sectional view, taken substantially along section line 3—3 of Figure 1 showing the mounting of the spacers on the machine.
Figure 4:
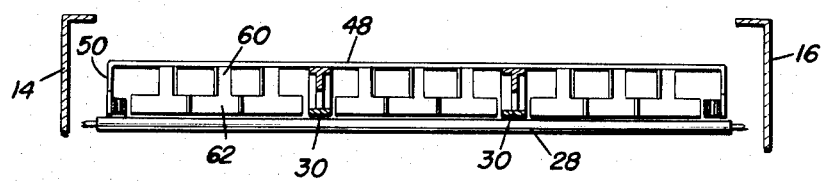
Figure 4 is a cross-sectional view taken substantially along section line 4—4 of Figure 1 showing the relation of the guide means of the present invention to the bottom of the stemming machine.
Figure 5:
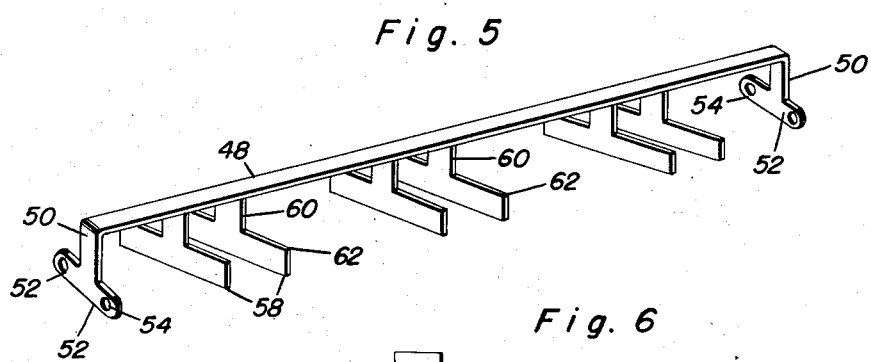
Figure 5 is a perspective view of a guide element forming a part of the present invention per se.
Figure 6:
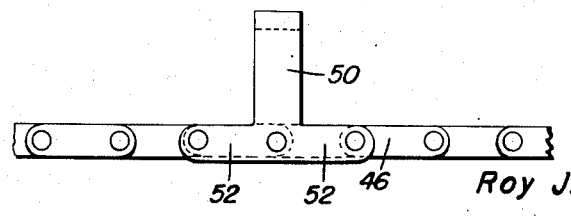
Figure 6 is an enlarged detail view showing the connection of the guide element to the conveyor chain.

The solid bottom of the frame 12 of the machine 10 is comprised generally of a plurality of abutting rollers extending transversely between the side frame members 14 and 16. These rollers are designated generally by the numeral 28. The rollers are adapted to rotate in opposite directions with one roller driving its adjacent roller in a direction opposite to the rotation of the driving roller. A suitable means for driving these rollers is that shown in the patent to Sanborn No. 2,048,470 issued July 21, 1936. However, other suitable means may likewise be used to drive these rollers. Elongated spacing members 30 mounted between and extending parallel to the frame members 14 and 16 divide the bottom 18 into three separate sections. It will be noted particularly in Figure 3 that the spacer members 30 are spaced slightly above the rollers 28 forming the solid bottom 18 of the frame by means of brackets 32 mounted on suitable supports 34, the ends of the brackets 32 projecting through the foraminous members 20 and 22 to form supports for the ends of the spacer members 30. The spacer members 30 are in substantially the form of I-beams, each I-beam having the major portion of its web removed throughout its length and the upper flanges thereof being angulated downwardly into mating engagement with the lower flanges at the ends of the beam. This is for a twofold purpose, first, to prevent wedging of the berries or other fruit against the edges of the spacer members and second, to provide an extremely light-weight construction.

A conveyor assembly 36, forming the essence of the present invention, is mounted on the frame 12 to feed the berries or other fruit over the rollers 28 forming the solid bottom 18 of the frame. The conveyor assembly 36 consists of a driving shaft 38 mounted at the forward end of the frame and journaled in the forward ends of the frame members 14 and 16 below the plane of the bottom 18 of the frame. Thus, the shaft 38 is disposed beneath the forward drainage screen or foraminous member 20. At the rear end of the frame, also below the plane of the bottom 18 of the frame is an idler shaft 40 which extends transversely of the frame and is journaled for rotation at the rear ends of the frame members 14 and 16. As will be noted, this idler shaft 40 is beneath the rear drainage screen 22. Driving sprockets 42 are mounted on the driving shaft 38 in approximate alignment with the ends of the rollers 28. Idler sprockets 44 are mounted on the idler shaft 40, also in approximate alignment with the ends of the rollers 28. Flexible members in the form of endless chains 46 are entrained over the driving and idler sprockets 38 and 44, respectively. By virtue of the relation between the driving and idler sprockets to one another, the chains 46 are spaced from and parallel to one another and lie closely adjacent and parallel to the frame members 14 and 16. Although in the preferred embodiment shown, sprocket and chain drive means are disclosed, it is to be understood that the same could be rollers and flexible belts or other similar means. One end of the drive shaft 38 extends laterally outwardly from the frame 12 and a driving pulley 50 is mounted thereon for rotating the driving shaft 38 and consequently the driving sprockets 42 and the endless chains 46. The upper runs of the chains 46 ride over and closely adjacent to the bottom 18 of the frame 12 for a purpose that will become immediately apparent.

Flat strips 48 extend between and are secured at their ends to the chains 46. These strips 48 may be formed of any suitable stock material and are longitudinally spaced along the endless chains 46. The ends of the strips 48 are downturned as at 50, with the free ends of the downturned portions 50 terminating in tabs 52 extending laterally from each side edge thereof. The laterally extending tabs 52 on each end portion 50 of the strips 48 are formed in the same manner as are the links of the chains 46, each tab 52 being slightly less in length than the length of one of the links. Apertures 54 formed in the tabs 52 secure the ends of the strips 48 to the pivot pins of the links of chains 46. It is to be noted that the downturned portions or legs 50 are of such a length as to permit the major portion of the strips 48 to pass over the spacer members 30 of the frame 12.

Pairs of spaced, parallel guide members in the form of T-shaped blades or paddles 58 depend from and are spaced axially along each of the strips 48 in such a manner that one pair of guide members of each strip is disposed in each of the sections formed on the bottom of the frame 12 by the spacer members 30. The T-shaped blades of the guide members are secured at the free ends of their webs 60 to the underside of the strips 48 so that the flanges 62 terminate adjacent the upper surface of the rollers 28. The space formed between each pair of guide members 58 forms a guide passage for fruit passing over the rollers 28.

Noting particularly Figure 1, it is seen that the blades 58 mounted on each of the strips 48 are arranged in such a manner that the flanges 62 extend diagonally from opposite sides of the strip 48. Further, the blades on adjacent strips are complementally diagonally related to one another to form a zigzag pattern. Also, one blade of each pair of blades on one strip has one end terminating closely adjacent one end of a blade of a diagonally related pair of blades on the next adjacent strip forming a complemental angle between these blades; the other blades of the aforementioned pairs are disposed on opposite sides of the abutting blades. Thus, one blade of each pair of blades forms a portion of a zigzag-shaped wall extending longitudinally of each of the free sections of the bottom 18 of the frame 12. The other blade of each pair of blades on each strip 48 forms a deflecting guide plate for guiding the fruit in a zigzag pattern across the rollers 28 of the bottom 18 of the frame.

By "complemental angle" as used above and in the appended claims is meant that angle included between the paddles of adjacent, transversely extending members whereby the paddles cooperate to perform their most efficient lateral deflection, this angle being of no fixed value, varying with the characteristics desired of the machine.

By this arrangement, when the fruit, such as strawberries, is discharged on to the stemming machine 10 from the inlet chute 24, the berries are caught between the blades 58 on the strips 48 and as these strips move longitudinally over the frame 12, the berries are forced to tumble or roll across the stemming rollers 28 in a multiplicity of directions and in a zigzag pattern so that it is almost certain that at some point during their passage across the oppositely rotating stemming rollers 28, the stems of the berries will be caught between these rollers and plucked from the berries. This zigzag motion of the berries in their passage across the stemming rollers 28 is particularly advantageous in the stemming of strawberries and other oval-shaped fruits since it causes them to be "up-ended" as they are tumbled over the stemming rollers whereby the stem may be drawn between the stemming rollers. This greatly increases the efficiency of mechanical stemming of these fruits to a degree heretofore encountered only in the stemming of round fruits.

From the foregoing description, the construction and operation of the device are believed to be readily apparent. However, since numerous modifications and changes will readily occur to those skilled in the art after a consideration of the foregoing specification taken in conjunction with the accompanying drawings, it is not desired to limit the invention to the exact construction shown and described. But, all suitable modifications may be resorted to falling within the scope of the appended claims.

Having described the invention, what is claimed as new is:

1. In a fruit stemming machine including an elongated stemming bed comprising a plurality of closely spaced, oppositely rotating rollers for cleaning the fruit, means for guiding and tumbling the fruit over the rollers comprising an endless conveyor assembly mounted on said machine and having at least one run thereof entrained above said rollers, said assembly including longitudinally spaced transversely extending members mounted thereon, a plurality of flat paddles, at least one paddle depending from a transverse member, at least one paddle on a succeeding transverse member in substantial longitudinal alignment with said first named paddle with respect to the length of the bed, said paddles being disposed at a complemental angle with respect to one another.

2. In a fruit stemming machine including an elongated stemming bed comprising a plurality of closely spaced, oppositely rotating rollers for cleaning the fruit, means for guiding and tumbling the fruit over the rollers comprising an endless conveyor assembly mounted on said machine and having at least one run thereof entrained above said rollers, said assembly including longitudinally spaced transversely extending members mounted thereon, a plurality of flat paddles, at least one pair of paddles depending from a transverse member in parallel, spaced relation to one another, at least one paddle on a succeeding transverse member in substantial longitudinal alignment with one of said pair of paddles with respect to the length of the bed, said one paddle and said one of said pair of paddles being disposed at a complemental angle with respect to one another.

3. In a fruit stemming machine including an elongated stemming bed comprising a plurality of closely spaced, oppositely rotating rollers for cleaning the fruit, means for guiding and tumbling the fruit over the rollers comprising an endless conveyor assembly mounted on said machine and having at least one run thereof entrained above said rollers, said assembly including longitudinally spaced transversely extending members mounted thereon, a plurality of flat paddles, at least one pair of paddles depending from a transverse member in parallel, spaced relation to one another, at least one pair of paddles depending from a succeeding transverse member in parallel, spaced relation to one another, at least one of the paddles of each pair of paddles being in longitudinal alignment with one of the paddles of the other pair of paddles with respect to the length of the bed, said longitudinally aligned paddles being disposed at a complemental angle with respect to one another.

4. The combination of claim 3 wherein the other paddles of said pairs of paddles are disposed on opposite sides of said aligned paddles.

5. In a fruit stemming machine including an elongated stemming bed comprising a plurality of closely spaced, oppositely rotating rollers for cleaning the fruit, means for guiding and tumbling the fruit over the rollers comprising an endless conveyor assembly mounted on said machine and having at least one run thereof entrained above said rollers, said assembly including longitudinally spaced transversely extending members mounted thereon, a plurality of flat paddles, pairs of paddles depending from each transverse member in parallel, spaced relation to one another, at least one paddle of each pair of paddles on each transverse member being in longitudinal alignment with one paddle of each pair of paddles on the next adjacent transverse member with respect to the length of the bed, said longitudinally aligned paddles being disposed at a complemental angle with respect to one another.

6. The combination of claim 5 wherein the other paddles of said pairs of paddles are on opposite sides of said aligned paddles.

References Cited in the file of this patent

UNITED STATES PATENTS

| | | |
|---|---|---|
| 883,708 | Fontana | Apr. 7, 1908 |
| 2,441,884 | Johnson | May 18, 1948 |
| 2,527,182 | Gaddie | Oct. 24, 1950 |
| 2,601,055 | Rahal | June 17, 1952 |